Jan. 17, 1967 G. A. HIGLEY ET AL 3,298,881
METHOD OF FORMING FACSIMILE IMPRESSIONS
OF BIOLOGICAL SPECIMENS
Filed April 15, 1963 2 Sheets-Sheet 1
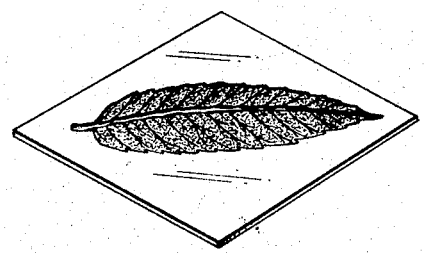
Fig. 1.
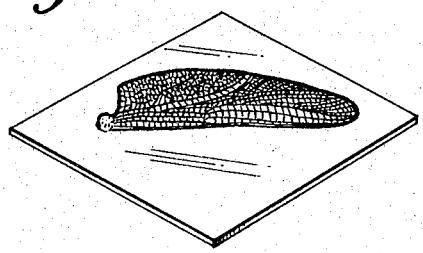
Fig. 2.
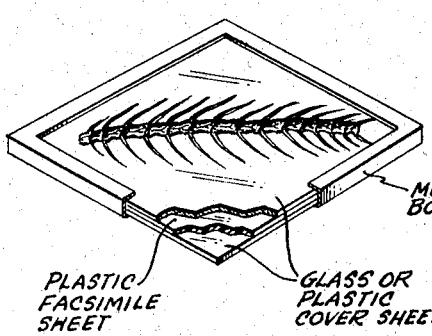
Fig. 3.
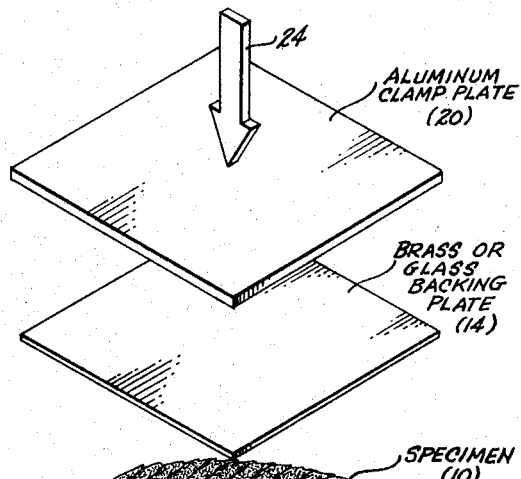
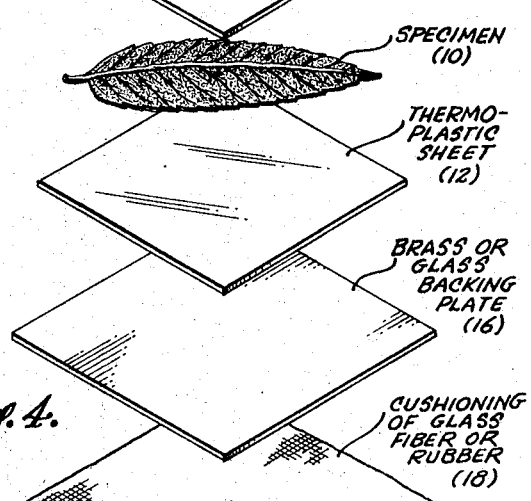
Fig. 4.
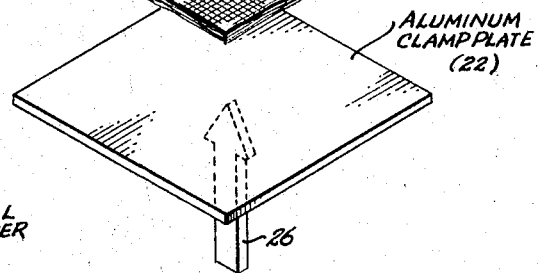
INVENTORS.
GEORGE A. HIGLEY
ANNA J. HIGLEY
BY
Mattis and Graybeal
ATTORNEYS INVENTORS
GEORGE A. HIGLEY
ANNA J. HIGLEY
BY Mattis and Graybeal
ATTORNEYS 3,298,881
METHOD OF FORMING FACSIMILE IMPRESSIONS
OF BIOLOGICAL SPECIMENS
George A. Higley and Anna J. Higley, both of
P.O. Box 228, Snoqualmie, Wash. 98065
Filed Apr. 15, 1963, Ser. No. 273,805
1 Claim. (Cl. 156—59)

This application is a continuation-in-part of our co-pending and now abandoned application Ser. No. 40,897, entitled Plastic Facsimile Impressions Of Biological And Like Speciments, Copies Of Such Facsimiles, And Methods Of Forming Same, and filed July 5, 1960.

This invention relates to the forming of accurate facsimile impressions in plastic, and more particularly to the forming of facsimile impressions of semi-rigid, thickly contoured biological specimens and the like, and to copies of such facsimiles, especially useful for display and study of the microscopic detail of the specimens.

Heretofore, the surface detail of non-transparent, contoured biological specimens of botanical, invertebrate, or verterbrate origin has been very difficult to reproduce for projection or microscopic examination with any acceptable degree of accuracy of detail and clarity of detail in the reproduction. Freehand drawings of the specimens are not only laborious, tedious and costly, but also cannot represent all natural detail, or give such detail with sufficient accuracy. Direct viewing or direct photographic reproduction of such non-transparent specimens oftentimes cannot show sufficient detail or give any clear indication of the three dimensional aspects of the specimen. Furthermore, the expense of such equipment leaves many school classrooms not adequately equipped to provide each student with the necessary microscopes, cameras, and other examination facilities to permit direct individual study and reproduction of specimens by all students simultaneously. Direct projectional display of a specimen, while remedying some of the problem, is not practical for a non-transparent specimen, such as a leaf, since often the specimen itself will deteriorate and since the projection results at least primarily in merely an outline or silhouette.

One prior technique for deriving an impression of a biological specimen is disclosed in Suzuki U.S. Patent No. 1,918,619, and involves use of a solvent to dissolve or liquify the surface of a plastic sheet so that it can receive an impression of the specimen. This technique, a so-called "wet" method, causes disturbance of the surface characteristics of the plastic material around the impression and also inherently involves a considerable degree of distortion of the impression itseilf in that the plastic upon resolidifying does not have the same surface regularity and smoothness as it had prior to being dissolved by the solvent. Rather, its surface irregularities tend to obscure and otherwise distort the details of the specimen impression and the bordering area, particularly when magnified under a microscope or projected onto a screen. Marked opacity or "milkiness" is also commonly encountered, both in the impression area and in the bordering area, in use of the Suzuki technique. Aftentimes, also, the resolidified plastic entraps portions of the specimen, destroying the quality of the facsimile impression.

Another technique for reproducing a biological specimen of a specialized type is disclosed in a publication of the International Pacific Salmon Fisheries Commission entitled "Bulletin IX: Collection and Interpretation of Sockeye Salmon Scales" by R. I. Clutter and L. E. Whitesel, published in New Westminster, B.C., Canada, in 1956. This publication contains a description of a plastic impression method wherein selected fish scales are mounted on kraft paper and an impression thereof made in plastic under pressure and elevated temperature in a platen press accommodating six plastic cards, each receiving the impression of forty fish scales, 240 individual scale impressions being made in one pressing operation. In this prior process, the fish scale facsimile impressions are roughly analogous to fingerprints and are studied for individual differences. The plastic cards carrying the fish scale impressions are inherently not of a quality to be ideally suited for projection in that the presence of the kraft paper ply in the pressurized assembly at the time the facsimile impressions are formed materially distorts the bordering areas around the facsimile impressions and to some degree also distorts the impression areas themselves. Further, this prior fish scale impression forming process fails to secure a maximum degree of microscopic detail in the impression for the reason that after heating the pressurized assembly is immediately removed from the press and the plastic sheets are allowed to air cool out of pressure contact with the fish scales, the plastic sheets peeling away from the platen in the process.

The forming of other objects from a rigid or substantially rigid positive by heat and pressure to make a negative impression in plastic are also known, such as the technique of making celluloid printing plates as disclosed in Ludwig U.S. Patent No. 747,738 and such as the technique for making phonograph records disclosed in Emerson U.S. Patent No. 878,513. However, as will be recognized, reproduction processes involving a rigid positive do not present comparable problems to those encountered when dealing with a simi-rigid biological specimen and seeking to reproduce accurate microscopic detail of such a specimen.

In order to bring out accurate and readily distinguishable microscopic detail when reproducing a biological specimen, and in order to provide a method of preparing examinable facsimiles and facsimile reproductions thereof cheaply and simply enough so that students can prepare their own facsimiles as laboratory projects, for example, the present invention undertakes to provide for specimen study and examination by preparing a biological facsimile impression in a particularized and specialized manner, adapted to emphasize and clearly present the microscopic detail in a form adapted for enlarged projection or microscopic examination by back lighting, side lighting or edge lighting techniques. In general terms, a biologcal facsimile produced by the present invention involves a reproduction of the microscopic detail and form of the biological specimen in a flat, transparent thermoplasic sheet, the insert impression of the specimen appearing on one surface of the sheet as a negative impression, with the resulting relative differences in thickness and transparency of the sheet giving a shadowlike easily distinguishable and easily viewable indication of the natural detail of the specimen, without bordering distortion.

As a related advantage of the invention, such biological facsimiles are ideally adapted to reproduction by photographic or like production means, either black and white or colored, with the shadow detail of the facsimile being faithfully reproduced by the photographic or like means, thereby providing for the first time a practical specimen reproduction technique capable of producing simply, economically and accurately any number of directly viewable copies of the natural specimen detail. Further, the biological specimen reproduction technique here presented can provide both facsimiles and facsimile copies of a clear and non-curling nature, readily and directly usable as slides for back-lighted projectors, micro projectors and overhead projectors, and are readily mountable as a projection slide assembly in a standard and customary manner. In essence, the non-transparent detail of the biological specimen is transformed to a selectively transparent three-dimensional form, the detail of the specimen appearing as differences in refractivity in the facsimile and the dimensional or configurational detail of the specimen also being faithfully retained for selective examination at various "levels" of detail by selective focal point variation on optical enlargement means. In contrast any direct photographic reproduction is simply two-dimensional, and cannot give any configuration detail.

The present invention also gives rise to important possibilities with respect to textual illustrations pertaining to biological specimens. Heretofore, it has been customary in the compiling of a textbook to illustrate non-transparent contour configurations and effects by means of reproducing hand-drawn reproductions of such configuration, simply because there was no known way of reproducing this type of detail for text illustration purposes. By virtue of the facsimile forming technique of the present invention, the non-transparent contour configurations of a specimen are available without any distortion of the surrounding area and can be captured in their natural detail by photographic means. With the detail photographed, such can of course be reproduced for printing by known techniques, e.g. photoengraving, photolithography or photogravure processes.

Also, facsimiles characteristic of the present invention are ideally adapted to the making by students of what are known as "leaf prints," where a specimen (in this case the specimen facsimile) is simply placed against positive photoprint paper and exposed to sunlight for a time. As will be apparent, making a leaf print directly of a non-transparent specimen will reproduce substantially only the outline of the specimen, whereas the leaf print of the type of facsimile here present will result in the obtainment in the print of at least most of the contour detail as well.

These and other features and advantages, together with certain controlling considerations as to suitable techniques for forming facsimiles according to the invention, as well as the characteristic qualities both express and implicit therein, and various modes of utilization of such facsimiles, will be apparent from the following specific description of typical facsimiles, typical methods of producing and reproducing same, and typical uses thereof, which description is to be considered along with the accompanying typical illustrations, wherein:

FIG. 1 is an isometric illustration of a facsimile characteristic of the present invention, prepared from a typical botanical specimen, specifically a Mountain Ash leaflet segment;

FIG. 2 is an isometric illustration of another facsimile characteristic of the present invention, showing the detail of a typical invertebrate specimen, specifically a Dragon Fly wing;

FIG. 3 is an isometric illustration of a display slide assembly including a facsimile of another type, from a vertebrate specimen, specifically a Herring spine;

FIG. 4 is a partially exploded, partially schematic isometric view of a typical press assembly for forming facsimiles according to the present invention by controlled heat and pressure.

Figure 5:
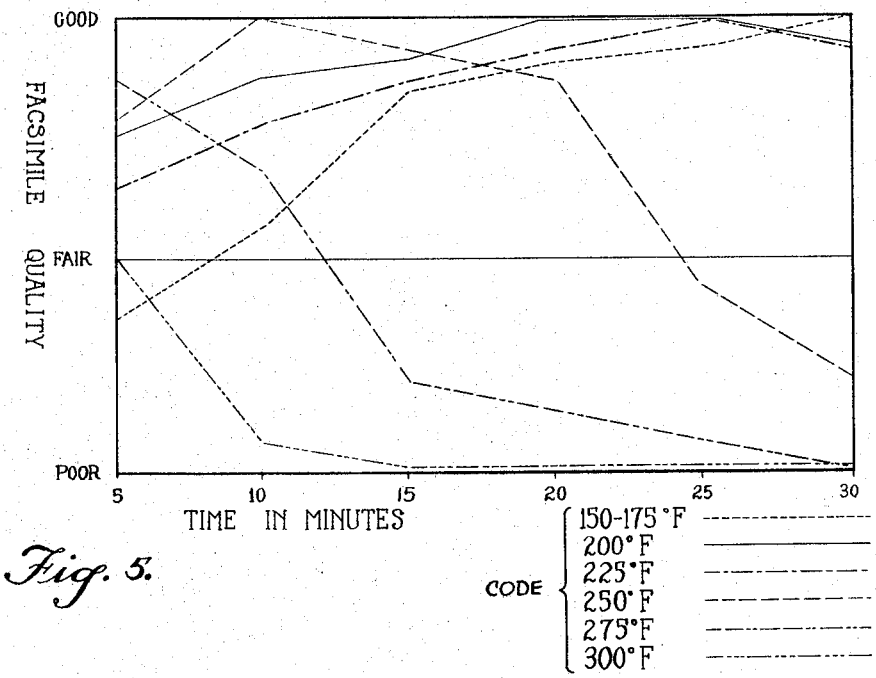
Figure 6:
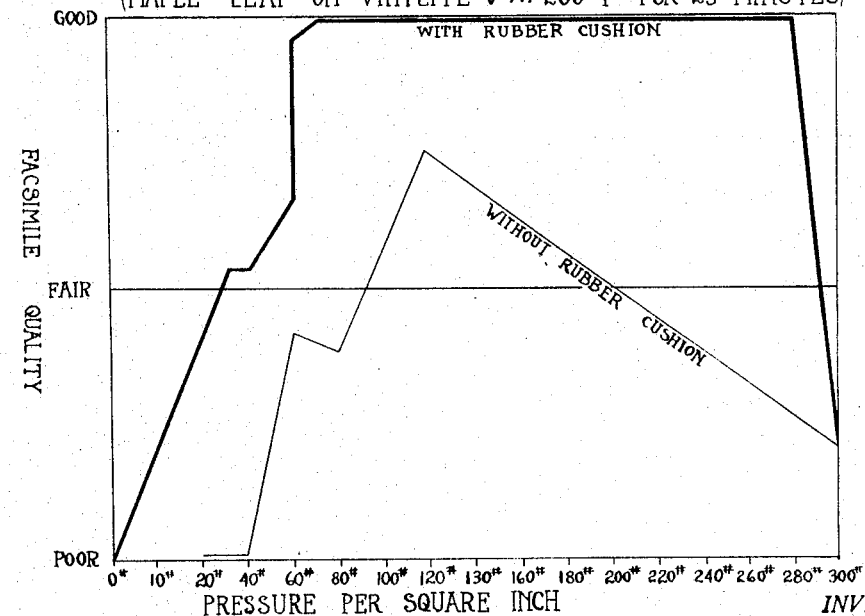

FIG. 5 is a graphical presentation of the effects of temperature variation at various times on a specimen of average strength, a maple leaf being selected by way of example, with impressions formed in Vinylite V at 100 p.s.i.; and FIG. 6 is a graphical presentation of the effect on facsimile quality caused by the use of rubber cushioning, at various pressures, the specimens selected for this study also being a maple leaf impressed on Vinylite V at 100 p.s.i.

As will be recognized from a consideration of the following description of certain typical examples of practice of the invention, several inter-related factors are involved.

The end use of the biological facsimile and the structural strength and thickness of the specimen will at least in part determine the appropriate properties and thickness of the specific plastic sheet employed to receive the impression, and will also dictate the extent and manner of application of the pressure used. Thus, if the facsimile is to be used directly as a projection slide, without cover sheets, the thickness of the sheet and temperature of plasticity of the plastic must be such that the facsimile will not curl when in a projector. However, if the use of the facsimile is simply to provide an original for photographic or like copying, the temperature of plasticity of the plastic sheet can be lower if desired. As evident also, is the consideration that the degree of pressure employed between the specimen and the plastic sheet, particularly, initially, should not cause any material permanent distortion of deformation of the surface configuration of the specimen. Further, as to the extent of final pressure used, such is governed in considerable measure by the nature of the specimen and also the fineness of detail desired. It has been found that beyond a certain minimum sufficient pressure, additional pressure will result in some loss of fineness of detail and accuracy of form.

As previously indicated, FIGS. 1, 2 and 3 respectively present three typical facsimiles formed according to the present invention, FIG. 1 illustrating a facsimile resulting from a specimen of a Mountain Ash leaflet segment, FIG. 2 presenting the facsimile resulting from a Dragon Fly wing specimen, and FIG. 3 showing the facsimiles resulting from a Herring spine specimen, which latter facsimile is mounted for further illustration in a protective slide assembly including two glass or plastic cover sheets and a metal border for retaining the sheet assembly together.

FIG. 4 presents by exploded, isometric view, with pressure application schematically shown, a suitable press assembly for forming typical facsimiles such as the three shown at FIGS. 1–3, and serves to illustrate in further detail certain aspects of the methods involved. In the press assembly, as shown in FIG. 4, the specimen 10 (the leaf segment used to form the facsimile shown at FIG. 1, for example), and a flat, smooth, transparent thermoplastic sheet 12 of suitable material such as a cellulose acetate, a polyvinyl acetate or a polyvinyl chloride such as Vinylite V, marketed by Union Carbide Corporation, for example, are situated between two polished, flat, readily cleanable, heat conductive backing plates 14 and 16, of brass, Pyrex glass, or the like, the clamped assembly further preferably including a cushioning mat 18 of multiple layers of woven glass fiber or of high temperature resistant rubber, for example, the assembly being completed by two relatively stiff outer clamp lates 20 and 22, preferably of metal having a good thermal conductivity, such as aluminum. Said cushioning mat 18 has been found to be important and advantageous to the quality of the facsimiles produced, in that such provides a degree of relatively stiff but somewhat resilient cushioning for the specimen, both initially and also at the time of slight plasticity or near-plastic state occurring when the impression is formed, the inherent resiliency or cushioning effect of mat 18 providing for initial cushioning and also for maintenance of substantially constant pressure between the specimen 10 and sheet 12 when the sheet is forming about the specimen, and further promoting a greater accuracy and exactness in the reproduction of the fine detail of the specimen. Shown schematically in FIG. 4 are pressure points 24 and 26, applied in any suitable manner compatible with the particular heating means utilized in conjunction with the assembly, one suitable form of such pressure means usable when the heat applied to the assembly is derived from a hot liquid bath, electric hot plate, or oven, for example, is a simple C-type clamp, as commonly used in the wood fabrication arts.

Thermoplastic sheet 12, referred to as being "transparent," can be either clear, i.e., colorless, or color tinted prior to forming of the impression therein, i.e., be a color toned transparent sheet, or can if desired be color tinted in one or more colors by surface staining or coating after the facsimile impression is formed, and the term "transparent" as used herein with reference to the thermoplastic sheet and the formed facsimiles is to be construed as including all such variations and equivalents thereof, the important consideration of course being that the sheet need be light pervious and sufficiently refractively clear to effectively permit non-diffused light transference therethrough.

Thermoplastic sheet 12 is large enough to leave at last about ¼" non-impressed edge or border around the specimen and its facsimile form. Such edge or border is particularly needed when the forming heat is derived by immersion of the clamped assembly in a liquid bath, such as hot water, in order that adequate sealing is accomplished to exclude water and prevent consequent milkiness of the plastic. The problem of milkiness or turbidity of the facsimile sheet is also occasion for having a substantially dry specimen. The need for edge sealing between plastic sheet 12 and the facing backing plate 14 is most pronounced at the outset of immersion, that is when the assembly is at about room temperature, because the rigidity of the plastic is then greatest and the pressure applied to the assembly usually comparatively low. However, with a given specimen of a generally flat nature, and with an appropriate amount of cushioning mat 18 or the like, it has been found that a satisfactory pressure sufficient to insure sealing around the specimen yet insufficient to cause permanent crushing of the specimen, can be readily determined in specific situations by experimental trial.

For forming facsimiles of biological specimens on an individual basis, it has been found very practical to utilize a hot water bath of controlled temperature for the lower temperature forming thermoplastics, and a controlled temperature oven for the more heat resistant plastics. With respect to the pressure applied to the assembly during the course of heating thereof to the point of pliancy or flowability of the plastic, appropriate pressures are determined, as indicated, by the nature of the specimen and the degree of detail sought. To provide a more specific indication as to certain specimens from which facsimiles of the types shown in FIGS. 1–3 can be made, and to show the related pressure considerations, it has been determined that the maximum pressure applied should not exceed about 200 pounds per square inch (p.s.i.) and is preferably a maximum of only about 30–70 p.s.i. for such specimens as compound eyes of insects, flower petals, insect antenna, and moth probiscus, is preferably not more than about 70–120 p.s.i. for plum, cherry and maple leaves, fern fronds, mosses, lichens, and bee's legs, and can be in the area of 120–200 p.s.i. for Mountain Ash, fir, cedar and hemlock leaves and Damsel Fly wing specimens. The final order of pressure employed will determine in considerable degree the extent of detail imparted to the facsimile impression. Thus, for example, a pressure of about 175 p.s.i. on a maple leaf will result in a good showing of its veinage, but no cell nuclei will be present in the facsimile configuration, but if a pressure of only about 70–105 p.s.i. is applied, the cell nuclei as well as the veinage will be transmitted to the facsimile.

All of the above types of biological specimens are termable "semi-rigid" in that they have some structural strength and some degree of rigidity in terms of being of definite shape and contour, yet they also have a degree of flexibility and are deformable and even crushable if subjected to compressive pressures greater than those above stated. The term "semi-rigid" is accordingly used herein to generally denote the types and characteristic structural nature of the biological specimens to which the invention is addressed.

The biological specimens to which the invention is addressed are also termable "thickly contoured" in that they are characterized by a considerable change in thickness dimension, comparing particular lateral thicknesses thereof with other lateral thicknesses. In the context used herein, said term "thickly contoured" is meant to include specimen contours wherein the ratio of greatest thickness dimension to least thickness dimension of the specimen is at least about 2:1.

For simplicity in application of a given degree of pressure to a suitable pressure imparting means holding the assembly, such as a C-type clamp with a ⅜" thread having 8 threads per inch, and employing a press assembly where the various sheets are 2" x 2" and the plates have a surface area of about 9 square inches (3" by 3"), the following tabulation provides a simple approximate conversion between pounds per square inch and the corresponding pounds force to be exerted on a 1 foot lever arm to correspond to such pressure.

| Foot pounds on a 1 foot lever arm: | Approximate pounds per square inch |
|---|---|
| 2 | 35 |
| 3 | 53 |
| 4 | 70 |
| 5 | 88 |
| 6 | 105 |
| 7 | 125 |
| 8 | 140 |
| 9 | 160 |
| 10 | 175 |
| 11 | 195 |

Using such foot-pound approximate equivalencies to in part describe the approximate pressure involved, and illustrating a specific technique in connection with a press assembly as shown in FIG. 4, a detailed further example of practice of the present invention proceeds as follows. All sheets are 2" x 2" and the plates employed are 3" x 3" in surface dimension. Upon a ¼" thick aluminum clamp plate 22 is placed three double layers of woven glass fiber matting 18. Then 1/32" brass backing plate 16 is placed on the matting, and plastic sheet 12 of .03" thickness is in turn placed on backing plate 16. The Mountain Ash leaflet segment specimen 10 is then placed vein down on sheet 12, backing plate 14 identical to plate 16 is placed thereon, and clamp plate 20 identical to plate 22 is placed on the top of the assembly or "sandwich." The assembly is then placed in and pressed together by a 3" C-type clamp (with a ⅜" screw having 14 turns per inch), the initial degree of pressure employed being 3 foot pounds or about 50 p.s.i. The pressurized assembly was then placed in hot water maintained at about 160°–180° F., and left there for about 7 minutes, after which time the pressure was increased to 6 foot pounds, i.e. about 105 p.s.i., following which the assembly was left in the hot water bath for about an additional 7 minutes, following which the pressure was further increased to 9 foot pounds or about 160 p.s.i., after which the assembly was again immersed in the hot water bath for about an additional 7 minutes. Following such heating and progressively increasing pressurization over a period of about 21 minutes, the assembly was removed from the hot water bath, cooled to about room temperature while the pressurization is maintained, and then disassembled. As will be apparent from this procedure, there is both a somewhat progressive increase in temperature of the sheet 12 in the impression receiving area thereof, and a progressive increase in the pressurization between the specimen and the sheet. Also notable with respect to the above example is the fact that the initial pressure is comparatively quite low (about 35 p.s.i.) while the final pressure is desirably several times the initial pressure (about 160 p.s.i.). Manifestly, variations in the range of pressures applied, the temperatures to which the assembly is subjected and the time of heating can vary widely with different types of specimens and different types of plastics receiving the facsimile impression.

To further illustrate practice of the invention, and to more quantitatively investigate the effect of time, temperature and pressure variations on specimen quality, a facsimile production equipment was devised involving a rigid aluminum base plate containing a thermostatically controlled electrcial heating element, a steel upper plate in parallel, spaced position above said base plate and joined thereto by half-inch bolts at the corners, and a manually operated hydraulic press with pressure gauge to show the extent of ram pressure exerted by the press. In this equipment, the specimen containing "sandwich" was placed between the press base and the said base plate, the ram head of the press reacting against the said upper plate of the equipment. In this case, the "sandwich" was constituted identically with that shown in FIG. 4, except that cushioning 18, when present, was placed between backing plate 14 and the base of the press (the latter being equivalent to clamp plate 20; see FIG. 4).

FIGS. 5 and 6 show test results determined on the basis of thermostatically controlled electrical heating and hydraulically imparted pressure in the above facsimile production equipment, all impressions reflected in said FIGS. 5 and 6 being of a maple leaf on Vinylite V plastic sheet, a maple leaf being selected for these tests because such represents average strength characteristics. Facsimile quality was judged on a comparative basis, in terms of "poor," "fair" and "good," with graduations therebetween, such quality determination having particular regard to the clarity of detail and accuracy of reproduction of the detail of the original specimen, observed by magnifier inspection and projection.

Observing FIG. 5, it is seen that the facsimile quality after a reasonable time (from about 15–30 minutes) was "good," or nearly so, without criticality as to time of formation. However, at a temperature of 250° F., sharp loss of facsimile quality occurred after 20 minutes. At 275° F., even though quality was reasonably "good" after 5 minutes, considerable deterioration had occurred after 10 minutes and for 15 minutes and longer times the quality was "poor" or nearly so. At 300° F., even after 5 minutes the quality was only "fair" and dropped sharply to "poor" for times of 10 minutes or more.

From the results of the tests reflected by FIG. 5, optimum forming time appears between 20–25 minutes, and the preferred temperature for Vinylite V at 100 p.s.i. should be from 150° F. to about 225° F., the lower temperatures being employed for lighter specimens and the higher temperatures being employed for heavier specimens, on a relative basis, the optimum temperature being about 200° F.

Related tests involving impressions of specimens in acrylic plastic sheet (Plexiglas) revealed that the optimum temperature was about 300° F. and the optimum pressure about 120 p.s.i.

FIG. 6 shows the effect of using a cushioning element (18; in FIG. 4). Under the test conditions indicated, and with the cushioning element present, progressive increase in pressure showed quite uniformly "good" for pressures from about 60 p.s.i. to over 280 p.s.i. However, without the cushioning element, even the best facsimile quality (at about 120 p.s.i.) was only about midway between "fair" and "good," and quality deteriorated sharply on either side of this figure, i.e. when pressure was either increased or decreased. Thus, it is clearly shown by FIG. 6 that the cushioning element is essential to good facsimile quality, from a practical point of view, and contributes very materially both to quality of specimen, and to a lessening of criticality as to order of temperature and pressure under which the facsimile is formed.

Highly successful facsimile productions characteristic of the invention have been made by employing much thicker plastic for sheet 12, even up to about ¼″ thick or more, the type of plastic in this instance for further example being of the acrylic type, and the final temperature employed being about 300° F.–350° F. in a thermostatically controlled oven, the total forming time being about 25 minutes and the final pressurization employed being about 120–200 p.s.i., again depending upon and directly related to the strength of the specimen.

From the nature of the facsimile forms as shown at FIGS. 1–3 and in view of the nature of the typical forminf processes as above described, it will be apparent that such provide from the refractivity of the plastic and the three-dimensional nature of the facsimile formed therein, a light pattern presenting in remarkable detail the natural detail of the specimen, and that the detail of the facsimile can be readily reproduced by photographic or like copying means, simply by conventional reproduction techniques. One suitable and in certain respects advantageous form of camera for making copy reproductions of such facsimiles is the type of fixed focus camera commonly employed by law enforcement agencies as a fingerprint camera.

As will also be readily recognized by those in the art, several and various modifications as to forming technique and assembly used therefor are possible. As will be apparent, any clamping arrangement can readily incorporate thermostatically controlled electrical heating means in one or both of the clamp plates, to serve as the controlled heat source. Pressure applying means which increase the pressure applied automatically in response to the increase in temperature, such as by incorporation of a bimetallic pressure applying structure, are also possible. Further, variations in the manner of assembling the "sandwich" shown in FIG. 4 can be made, such as by placing cushioning mat 18 between the clamping plate 20 and backing plate 14, with clamp plate 22 placed either against backing plate 16 or directly against thermoplastic sheet 12 if plate 22 is sufficiently smooth, with backing plate 16 omitted. Either or both of clamping plates 20 and 22 can be integral with the respective pressure applying means designated at 24 and 26, if desired.

From the foregoing consideration of various examples and related considerations and techniques, as well as the nature of the facsimiles and copies of facsimiles resulting from the invention, various further forms, techniques, procedures, modifications and variations thereof will readily occur to those skilled in the art, within the scope of the following claims.

What is claimed is:

The method of forming an indented facsimile impression of a thickly contoured, semi-rigid biological specimen in a transparent thermoplastic sheet to faithfully and substantially microscopically reproduce theree-dimensional thickness detail of the specimen without materially distorting or otherwise impairing the light transmitting properties of the bordering area of the plastic sheet surrounding the facsimile impression therein, said method comprising subjecting the specimen to cushioned pressure and elevated temperature for a substantial time by: sandwiching a flat-faced thermoplastic sheet and the biological specimen directly in contact with one another; directly interposing said sheet and specimen between polished plates; backing at least one of said plates with a flat sheet of cushioning material; uniformly applying to said plates sufficient pressurization to cause an impression to be made in the thermoplastic sheet when in a near-plastic condition but insufficient pressurization to permanently upset the surface configurations of the specimen, the pressurization of the specimen being characterized by an initial pressurization for an initial period, an intermediate pressurization for an intermediate period and a maximum pressurization for a final period, such successive periods of pressurization each being about equal, and the initial pressurization being about one-third the final pressurization, while the intermediate pressurization is about two-thirds the final pressurization, said final pressurization being from about 30–200 p.s.i with relatively greater maximum pressures being used for relatively more rigid specimens; heating the pressurized assembly to an elevated temperature just below the temperature of plasticity of the thermoplastic sheet; maintaining the assembly in heated condition for a time sufficient for the specimen to form an inverse impression in the near-plastic thermoplastic sheet; cooling the pressurized assembly to substantially room temperature while maintaining the pressurization thereof; then disassembling the assembly and removing the specimen from the formed thermoplastic sheet.

References Cited by the Examiner

UNITED STATES PATENTS 2,345,629　4/1944　Reilly _____ 264—293
2,606,855　8/1952　Jenkins.
2,970,345　2/1961　Wangner.

OTHER REFERENCES

Bulletin IX. Collection and Interpretation of Sockeye Salmon Scales by Chitler et al. Int. Pac. Salmon. Fisheries Com. New Westminister B. C. Canada 1956.

ALEXANDER WYMAN, *Primary Examiner.*

J. STEINBERG, *Examiner.*